US008185628B2

(12) United States Patent
Hu et al.

(10) Patent No.: US 8,185,628 B2
(45) Date of Patent: May 22, 2012

(54) ENHANCED POLICY CAPABILITIES FOR MOBILE DATA SERVICES

(75) Inventors: Q. James Hu, Sammamish, WA (US); Douglas Eng, Sammamish, WA (US); Terry Figurelle, Redmond, WA (US); Michael Britt, Everett, WA (US); Jie McKnight, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1045 days.

(21) Appl. No.: 12/116,896

(22) Filed: May 7, 2008

(65) Prior Publication Data
US 2009/0227228 A1    Sep. 10, 2009

Related U.S. Application Data

(60) Provisional application No. 61/034,829, filed on Mar. 7, 2008.

(51) Int. Cl.
*G06F 13/00* (2006.01)
(52) U.S. Cl. ......... 709/225; 709/219; 709/224; 709/250
(58) Field of Classification Search ................ 709/217, 709/219, 223, 224, 225, 227, 228, 229, 250
See application file for complete search history.

(56) References Cited

U.S. PATENT DOCUMENTS

| 7,680,478 | B2* | 3/2010 | Willars et al. | ............. 455/343.2 |
| 7,869,393 | B2* | 1/2011 | Maxwell et al. | ............. 370/328 |
| 2007/0066286 | A1 | 3/2007 | Hurtta | |
| 2007/0195755 | A1* | 8/2007 | Li et al. | ......................... 370/352 |

FOREIGN PATENT DOCUMENTS

WO    WO/2004-029854 A2    4/2004

OTHER PUBLICATIONS

"3GPP TS 23.203 3$^{rd}$ Generation Partnership Project: Technical Specification Group Services and System Aspects: Policy and charging control architecture (Release 8) v8.0.0" 3GPP, Dec. 2007, XP002575482 [retrieved on Mar. 17, 2010].
International Preliminary Report on Patentability for PCT/US2009/036346, Sep. 7, 2010, 7 unnumbered pages.
International Search Report and Written Opinion for PCT/US2009/036346, Apr. 9, 2010, 9 unnumbered pages.

* cited by examiner

*Primary Examiner* — Viet Vu

(57) ABSTRACT

A system and method for a mobile data access network to make policy control and charging decisions based on domain name queries. A mobile device sends a query about a domain name associated with a service a user of the mobile device wishes to engage. The access network carries the domain name query from a mobile device to a domain name server. The access network detects the domain name query and copies the queried domain name. The access network uses the queried domain name to make an incomplete policy decision. The policy decision is incomplete because one or more service data flow filters in the decision lack addresses for providers of the service. The access network detects a response to the domain name query and copies a service provider address from the response. The access network uses the service provider address to complete the policy decision.

12 Claims, 2 Drawing Sheets

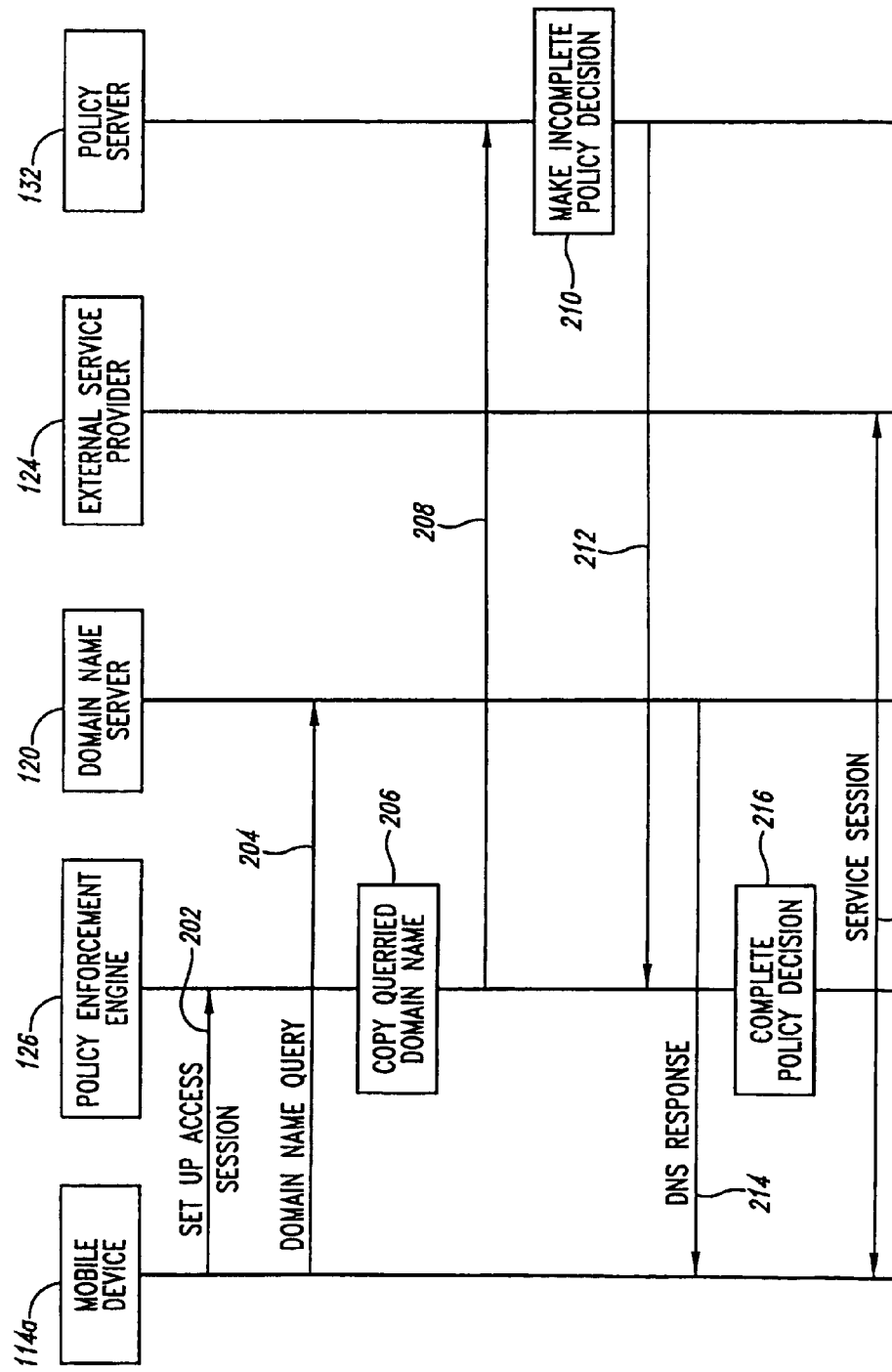

ENHANCED POLICY CAPABILITIES FOR MOBILE DATA SERVICES

BACKGROUND OF THE INVENTION

1. Field of the Invention

The present invention is directed generally to the control of data networks serving mobile wireless users. In particular, the present invention is directed to a system and methods for making policy decisions based on domain name queries.

2. Description of the Related Art

Operators of mobile wireless networks have in recent years added data networks to their core networks to allow them to offer data services to their mobile subscribers. However, network operators did not develop unified systems for controlling subscriber access and did not develop a unified way to charge for data services. For example, a network operator may have deployed one control and charging system at a network gateway for general access to data network services and then deployed control and charging systems for each individual service offered. However, this approach has become increasingly burdensome as network operators want to deploy ever more services.

New services could be deployed faster and with less expense if each new service did not require a new controlling and charging system. To meet this need, standards bodies have proposed standardized policy and charging control architectures. One example of this effort is the 3GPP R7 Policy Control and Charging Architecture. (See Technical Specification 23.203 V8.0.0 (2007-12), which is incorporated by reference in its entirety). This architecture allows customized control and charging policies to be made and enforced for unique combinations of subscribers and services. Each subscriber may have a unique assortment of services that the subscriber is allowed to use, at rates unique to the subscriber. Each service may have unique requirements for network resources in order to properly provide the service.

Services available to mobile network subscribers are becoming more complex, with some services being provided over a plurality of service data flows. For example, a multimedia call service may comprise Session Initiated Protocol (SIP) signaling, a Voice Over Internet Protocol (VoIP) session, and streaming media, each delivered over a separate service data flow.

In addition to the services themselves becoming more complex, the source of these services is becoming more complex. The sources of services are referred to herein as service provider elements. Some of these service provider elements are application functions that are part of an operator's mobile data network, but other service providers are part of networks external to the operator's network. Examples of external networks are the internet or another mobile wireless network run by a different operator. If the network operator allows subscribers to access services provided by external networks, the network operator can apply a single policy to all such services equally or find some means for identifying the service the subscriber is accessing and apply a policy tailored for that service. The 3GPP policy and charging architecture provides a way for identifying externally originating service data flows when these service data flows attempt to use the operator's mobile data network. A different policy decision is made for each service data flow, and only after the particular service data flow is identified. This may lead to some delay in service delivery while the policy decisions are made. Therefore, it can be appreciated that there is a significant need for a wireless communication system that efficiently applies service policies to multiple service data flows. The present invention provides this and other advantages as will be apparent from the following detailed description and accompanying figures.

BRIEF DESCRIPTION OF THE SEVERAL VIEWS OF THE DRAWINGS

FIG. 2 shows a call flow diagram of a method for an access network to make policy decisions based on domain name queries by mobile devices.

DETAILED DESCRIPTION OF THE INVENTION

Figure 1:
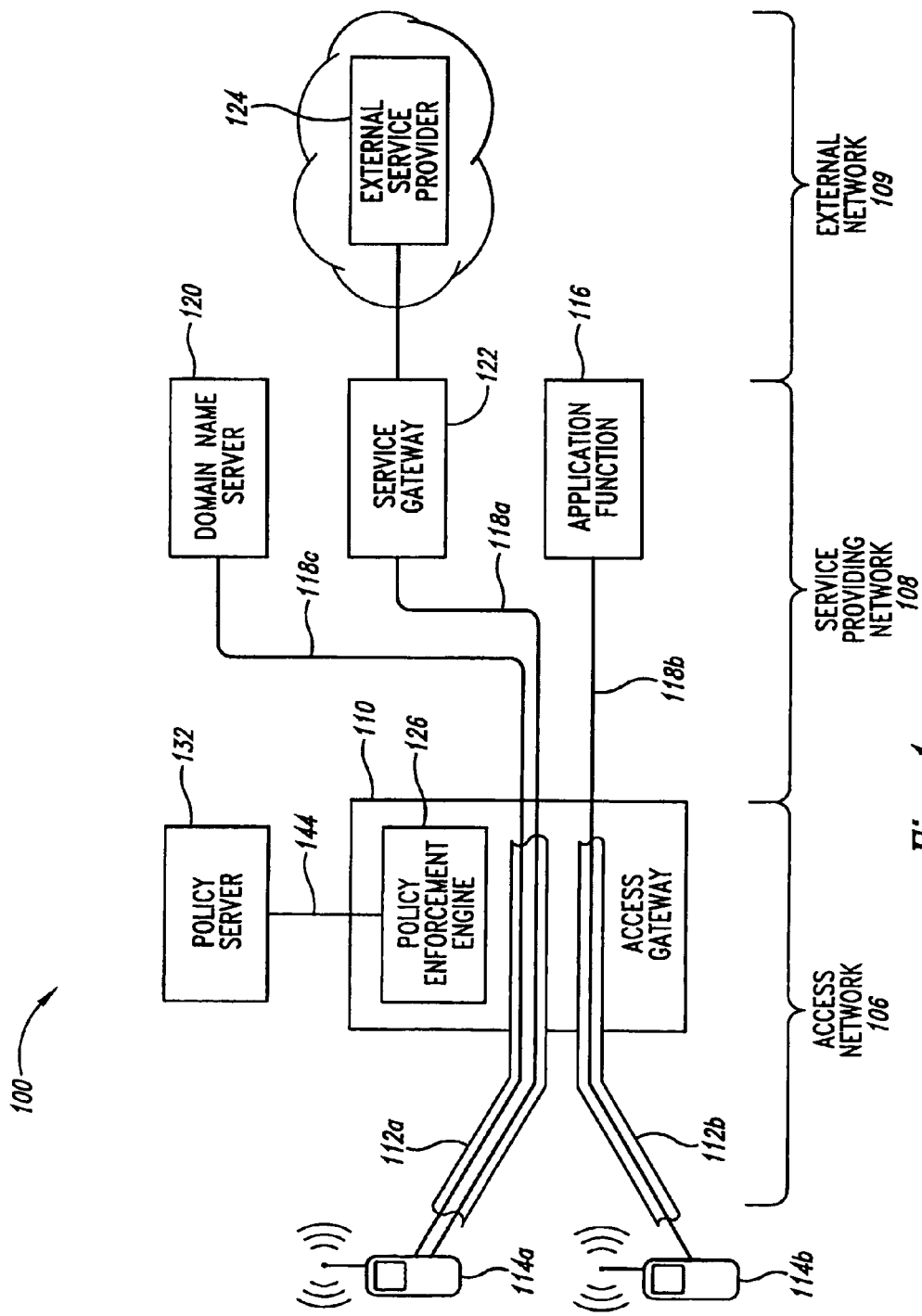
FIG. 1 shows an example of a mobile data network with the capability to make policy decisions based on domain name queries.

Described herein are several embodiments of an enhanced policy capability mobile service control architecture. This control architecture enables a mobile data network to make a single policy decision for all the service data flows associated with a service. This control architecture further enables a mobile data network to make a policy decision based on a domain name query for a service and be ready to enforce the decision before the service attempts to use the mobile data network. Some embodiments of this enhanced architecture can be considered extensions of the 3GPP architecture, in the sense that this invention does not contradict the 3GPP standard. However, some embodiments for this enhanced architecture are not fully compliant with 3GPP. Additionally, the invention does not depend on the 3GPP standard and other embodiments of this new architecture apply the principals of this invention in an architecture not fully compliant with 3GPP.

In the Figures, various objects are identified with reference numbers. If there are multiple copies of the same object in a figure, they will be referred to by the same reference number but with a different suffix letter appended. In the following discussion, if a reference is made to a reference number that identifies multiple objects but without a suffix letter appended, then the reference is to all the multiple objects as a group or in a generic sense.

FIG. 1 shows an example of a mobile data network 100 with a capability to make policy decisions based on domain name queries. The mobile data network 100 is divided into an access network 106 and a service providing network 108. Also shown in FIG. 1 is an external network 109, coupled with, but not part of, the mobile data network 100. The internet is one example of the external network 109. The external network 109 has at least one external service provider 124.

The access network 106 is configured to set up access bearers 112 to connect mobile devices 114 to an access gateway 110. The access gateway 110 is part of the access network 106 and demarks a boundary with the service providing network 108. The access network 106 is further configured to track the mobile devices 114 as they move through a geographical area covered by the mobile data network 100 and is configured to ensure the access bearers 112 are routed to the proper wireless facilities (not shown) to maintain connectivity with their respective mobile devices 114. The access bearers 112 are data packet transmission paths of a defined capacities, delay and bit error rates. In the example of FIG. 1, the access network 106 sets up a first access bearer 112a between a first mobile device 114a and the access gateway 110. The access network 106 sets up a second access bearer 112b between a second mobile device 14b and the access gateway 110. Each of the mobile devices 114 is registered on the mobile data network 100 to a subscriber, usually one mobile device 114 to a subscriber. In the example of FIG. 1, the first mobile device 114a is registered to a first subscriber and the second mobile device 114b is registered to a second subscriber.

The service providing network 108 is configured to provide services for mobile devices 114. The service providing network 108 in FIG. 1 has an application function 116, a domain name server (DNS) 120 and a service gateway 122.

The mobile data network 100 shown in FIG. 1 is a simplified for clarity. Persons of skill in the art will appreciate that mobile data networks may have larger numbers of access gateways 110, application functions 116, and service gateways 122.

The application function 116 is configured to provide one or more sessions of a service. Each service may go to a different mobile device 114, though multiple sessions may go to the same mobile device 114.

Service sessions are carried over service data flows 118. A service data flow 118 comprises a stream of data packets exchanged between logical elements participating in a service session. Service data flows 118 may be unidirectional or bidirectional. Service data flows are carried through the access network 106 to mobile devices 114 by access bearers 118. In the example of FIG. 1, the first access bearer 112a carries a first service data flow 118a between the external service provider 124 and the first mobile device 114a through the service gateway 122. A second access bearer 112b carries a second service data flow 118b between the application function 116 and the second mobile device 114b. The first access bearer 112a carries a third service data flow 118c between the domain name server 120 and the first mobile device 114a. Data packets can be identified as belonging to a particular service data flow by identifying information in the data packets, usually the Internet Protocol (IP) addresses and port numbers of the logical elements participating in the service session. A service session may have more than one service data flow 118 and an access bearer 112 may carry more than one service data flow 118. The number of service data flows 118 that a particular access bearer 112 can carry is determined by the capacity of the access bearer 112 and its ability to meet Quality of Service (QoS) requirements of the service data flows 118 that it is carrying.

The service gateway 122 is configured to route service data flows between the mobile data network 100 and an external network 109. The external network 109 is a wide area network (WAN) that is not part of the mobile data network 100. The service gateway 122 is also configured to translate a service data flow (e.g., the service data flow 118a) from a first protocol to a second protocol. The service gateway 122 allows an external service provider (e.g., the external service provider 124) to provide a service session to a mobile device (e.g., mobile device 114a). For example, the external service provider 124 may provide web pages in Hyper-Text Mark-up Language (HTML) protocol and the service gateway 122 would translate the HTML into Web Access Protocol (WAP).

The domain name server 120 is configured to receive a request with a text-based domain name and return an associated numerical IP address. For example, the application function 116 providing a service called "myservice" could be represented by a domain name "myservice.somewhere.com." and associated with an IP address "12.123.31.200." If the second mobile device 114b wants to use the service "myservice" provided by the application function 116, the second mobile device 114b must resolve the domain name into an IP address. The second mobile device 114b is configured with the IP address of the domain name server 120. The second mobile device 114b sends a query to the domain name server 120 with the domain name "myservice.somewhere.com."

The domain name server 120 returns the IP address "12.123.31.200." The second mobile device 14b uses the returned IP address to send a request to the application function 116 for the service. In FIG. 11 the domain name server 120 is shown as part of the service providing network 108. In other embodiments, the domain name server 120 may be part of the external network 109.

The policy enforcement engine 126 is a logical element that applies policy decisions to service data flows 118 passing through the access gateway 110. Typically, the policy enforcement engine 126 is physically located in the access gateway 110. Policy decisions are based on policies established by an operator of the mobile data network 100.

The term "policy," as used herein, is a set of instructions for handling one or more service data flows 118. The handling instructions may include controlling instructions, charging instructions or both. The policy may be very generic and be applicable to many different services and subscribers. Alternatively, the policy may be specific to a category of services or to a single service while applicable for many different subscribers. In yet another alternative, the policy may be specific to a category of subscribers or to a single subscriber while applicable for many different services. In still yet another alternative, the policy may be specific to a subscriber and specific to a service, but not to a session of that service.

While a policy may be broadly generic or directed to specific types of services or subscribers, the policy is generally missing at least some information needed for handling a service data flow for a specific subscriber and specific service session. This missing information is referred to herein as "context data." Context data includes subscription information and service information.

Subscription information may include instruction parameters, such as a unit price to which the subscriber has agreed for a particular service. Subscription information may include a list of services that a particular subscriber is allowed to access.

Service information includes service data flow filters or includes information that can be used to generate one or more service data flow filters. The service data flow filters can be used to identify one or more service data flows 118. Information that can be used to identify a service data flow usually includes the Internet Protocol (IP) addresses and port numbers of the logical elements (e.g. the mobile device 114b and the application function 116) participating in the service session. Service information may include QoS requirements for the specific service session. For example, a set of service information may include a QoS requirement for a minimum bit rate of 150 kilobits per second.

The policy and the context data are used to generate a "policy rule," which includes specific instructions for handling one or more service data flows 118 (e.g. the second service data flow 118b) carrying a specific service session for a specific subscriber. A policy decision comprises a set of policy rules bound to information identifying an access bearer (e.g., the second access bearer 112b).

The policy enforcement engine 126 enforces a policy decision by examining data packets passing through the access bearer (e.g., the second access bearer 112b) identified by the policy decision. The data packets are examined to detect service data flows 118 that match the one of the filters in the rules that are part of the policy decision. The policy enforcement engine 126 applies the instructions to the packets in the matching service data flow 118. For example, suppose the application function 116 provides a remote presentation service to the second mobile device 114b. This remote presentation service displays a series of images, such as slides used in a talk. This images series is carried by the second service data flow 118*b* through the second access bearer 112*b*. The policy enforcement engine 126 is loaded with a policy decision generated for the remote presentation service session. The policy decision has information identifying the second access bearer 112*b* and has a policy rule for the service data flow carrying the image series (i.e., the second service data flow 118*b*). The policy rule has a particular service data flow filter to detect the service data flow carrying the image series (i.e., the second service data flow 118*b*). The policy enforcement engine 126 examines the packets passing through the second access bearer 112*b*, looking for matches to the particular service data flow filter. The packets that match this service data flow filter belong to the second service data flow 118*b*. The policy enforcement engine 126 applies the policy rule to any packet identified as belonging to the second service data flow 118*b*. This policy rule may have charging instructions directing, for example, an on-line charging system charge $0.0001 per bit in the packet to the account of the second subscriber. The policy rule may have control instructions directing, for example, that the QoS class identifier in the packet header be set to class 5.

The policy enforcement engine 126 is configured to detect a domain name query on a particular domain name from a mobile device (e.g., the second mobile device 114*b*). The policy enforcement engine 126 is further configured to request a policy decision based on the domain name detected.

The policy server 132 is configured to manage policies, to assemble policy rules, and to make policy decisions. Managing of policies includes the initial creation of policies, revision of policies, formatting of policies, storing of policies, and routing of policies throughout the network 100. The policy server 132 is configured to assemble a policy rule for a particular service session and particular subscriber participating in the service session. This assembly is performed by first selecting a policy using information about the service session and/or information about the subscriber. Subscription information is then obtained using the subscriber information and service session information. The rule can then be generated using the policy and context data. The policy server 132 is also configured to create a policy decision based on the policy rule and information about an access session. Access session information includes information identifying an access bearer (e.g., the second access bearer 112*b*) serving a mobile device (e.g., the second mobile device 114*b*) associated with the subscriber designated to participate in the service session.

The policy server 132 is further configured to generate an incomplete policy decision in response to a request for a policy decision based on a domain name query. The incomplete policy decision has one or more service data flow filters that lack addresses for one or more service provider elements (e.g., the application function 116 or the external service provider 124) that provide a service associated with the queried domain name. The policy server 132 is configured to generate the incomplete policy decision using the queried domain name, subscriber information and access bearer identifying information received from the policy enforcement engine 132. The policy server 132 is configured to generate the incomplete policy decision by first selecting one or more policies, then assembling context data, then assembling one or more policy rules using the polices and context data and then binding the rules with the access bearer identifying information. This is similar to how the policy server 132 is configured to make complete policy decisions, except that instead of using service information to select policies and assemble context data, the policy server 132 uses the queried domain name. To achieve this, the policy server 132 is configured to catalog policies according to domain name. The policy server 132 is configured to catalog policies by the IP addresses of the service providers as well.

In some embodiments, the policy server 132 is configured to send the incomplete policy decision to the policy enforcement engine 126. The policy enforcement engine 126 is configured to complete the policy decision after receiving the IP address(es) for the service.

In other embodiments, the policy server 132 is configured to retain the incomplete policy decision. The policy server 132 is configured to complete the policy decision after receiving the addresses for the service from the policy enforcement engine 126. The policy server 132 is configured to send the completed policy decision to the policy enforcement engine 126.

In some embodiments, the policy server 132 is configured to generate the incomplete policy decision with a service data flow filter based on a domain name instead of an IP address. The service data flow filter includes a text string of the domain name or regular expression based on the domain name. A regular expression is a formal statement that describes a set of text strings without listing all strings in the set. A regular expression uses wildcard and other symbols to give a concise statement. For example, with a wildcard symbol "*," a regular expression of "myservice.*.com" would match with domain names "myservice.anywhere.com" or "myservice.nowhere.com" or "myservice.somewhere.com." The policy enforcement engine 126 is configured to enforce this policy decision on packets passing through the access gateway 110 by examining each packet for domain names matching the service data flow filter. The policy enforcement engine 126 is configured to apply instructions from the policy decision on packets with matching domain names. When the domain name has been resolved to an IP address, the policy enforcement engine 126 may replace the domain name filter with an IP address filter based on the resolved IP address.

The policy server 132 is logically linked to the policy enforcement engine 126. In some embodiments, the policy server 132 is physically deployed in the same access gateway 110 as the policy enforcement engine 126. In other embodiments, the policy server 132 is physically deployed in a physical network element other than the access gateway 110.

A policy reference point 144 logically links the policy server 132 and the policy enforcement engine 126. The policy reference point 144 is configured to carry subscriber information and access session information from the policy enforcement engine 126 to the policy server 132 and carry policy decisions from the policy server 132 to the policy enforcement engine 126. The policy reference point 144 is also configured to carry requests for policy decisions from the policy enforcement engine 144 to the policy server 132. The policy decisions requests may include requests with a domain name copied by the policy enforcement engine 126 from a domain name query. In some embodiments, the policy reference point 144 conforms with the 3GPP specification for the Gx reference point. In some embodiments, the policy reference point 144 conforms with the DIAMETER specification, but not the Gx specification. In some embodiments, the policy reference point 144 does not conform with the Gx specification. The policy reference point 144 is not limited to any particular signaling protocol.

FIG. 2 illustrates an example call flow diagram of a method in an access network to make policy decisions based on domain name requests by mobile devices. In step 202, the first mobile device 114*a* sends a request for an access session. Setting up the access session is necessary before the first mobile device 114*a* can participate in service sessions. The access gateway 110 (shown in FIG. 1) receives the access session request and sets up the first access bearer 112a between the first mobile device 14a and the access gateway 110. The access gateway 110 sends an IP address of the domain name server 120 to the first mobile device 114a.

In step 204, the first mobile device 114a sends a query about a domain name to the domain name server 120. In the example of FIGS. 1 and 2, the mobile device 14a intends to request a service called "stock market ticker." The mobile device 114a does not know the address of "stock market ticker," but knows that the domain name for "stock market ticker" is "www.stock-ticker-service.com." The mobile device 114a queries the domain name server to find the address of "www.stock-ticker-service.com." In this example, the domain name "www.stock-ticker-service.com." is registered to the external service provider 124, which has an IP address of 205.178.190.28.

In step 206, the policy enforcement engine 126 detects the domain name query and copies the queried domain name. The original query proceeds on to the domain name server 120 and the copy of the queried domain name is retained for use in the next step. Conventional policy enforcement technology only examines the IP header of a packet. Copying the domain name requires the policy enforcement engine 126 to look deeper into a packet than just the header, parsing the payload of the packets carrying the domain name server query to find the queried domain name. In some embodiments, the policy enforcement engine 126 detects the domain name query by examining packets passing through the gateway 110 and detecting which packets have headers with a destination address that matches the IP address for the domain name server 120. In the cases where the mobile devices knows of multiple IP address for the domain name server 120 or multiple domain name servers, then detecting domain name server queries is performed by detecting which packets match a regular expression based on the multiple IP addresses. The packets matching a domain name server IP address define the third service data flow 118c (shown in FIG. 1).

In step 208, the domain name server 120 sends the domain name query response to the first mobile device 114a. The domain name query response includes address(es) of service providers associated with the queried domain name. In the example of FIGS. 1 and 2, the domain name response includes the IP address 205.178.190.28, which is registered to the external service provider 124 with the domain name "www.stock-ticker-service.com." In some embodiments, the domain name server 120 is a recursive domain name server and will return a response with a complete IP address. In other embodiments, the domain name server is a non-recursive domain name server, in which case step 204 may be repeated, each time sending the query to a lower level domain name server until the domain name is fully resolved into an IP address.

In step 210, the policy enforcement engine 126 sends a request for a policy decision to the policy server 132. The copy of the queried domain name is sent to the policy server 132 with the policy decision request. At this point in time, the first mobile device 114a has not yet contacted the external service provider 124 and requested the service "stock market ticker," but has indicated its intention to do so by virtue of the domain name query for "www.stock-ticker-service.com" in step 204. By requesting the policy decision at this point, rather than waiting for the actual service request to be made or waiting for the actual service data to begin flowing or waiting for the IP addresses to be returned by the domain name server 120, the policy enforcement engine 126 advantageously enhances the policy management process by initiating policy decision requests on the basis of the domain name. This procedure allows the mobile data network 100 to be ready to control and charge for the service sooner than would be possible with conventional policy enforcement technology.

In step 211, the policy server 132 makes a policy decision based on the queried domain name. The policy decision may be considered an incomplete policy decision if a response has not yet been received from the domain name server 120 in step 208 because it has one or more service data flow filters that lack service provider address information, which can be actual service provider addresses or regular expressions based on service provider addresses. These service data flow filters lack service provider address information because the policy server 132 does not yet know the addresses of the service providing elements that provide the service that the first mobile device 114a has indicated that it will request. The service provider address information is not known at this point because the queried domain name has not yet been resolved to an IP address.

In step 212, the policy server 132 sends the policy decision (complete or incomplete) to the policy enforcement engine 126. Resolution of domain name queries can take relatively long periods of time, so the policy enforcement engine 126 is likely to receive the incomplete policy decision before the domain name server 120 sends a response to the domain name query. Those skilled in the art will appreciate that not all steps must be performed in the precise sequence illustrated in FIG. 2. For example, the request for a policy decision in step 210 need not wait until a domain name server response is received in step 208. The response from the domain name 120 server may be delayed. Therefore, step 210 may be performed to request an incomplete policy decision while the system 100 is awaiting a response from the domain name server 120. Indeed, an incomplete policy decision may be made in step 211 and the response received in step 212 before the domain name server response is received in step 208. Thus, certain of the steps illustrated in FIG. 2 may be performed out of sequence.

In step 216, the policy enforcement engine 126 completes the policy decision. To complete the policy decision, the policy enforcement engine 126 detects the domain name response, and then copies the service provider address(es). The policy enforcement engine 126 then uses the service provider address(es) to add service provider address information to the service data flow filters of the incomplete policy decision.

In step 218, the first mobile device 114a sets up a service session with the external service provider 124. The service session is carried by the first service data flow 118a (show in FIG. 1). The policy service engine 126 then uses the completed policy decision to provide control and charging on the first service data flow 118a.

In some embodiments, the policy enforcement engine 126 acts as a proxy for domain name queries. Instead of sending the domain name query to the domain name server 120 in step 204, the mobile device 114a sends the query to the policy enforcement engine 126. In step 206, the policy enforcement engine 126 then resolves the domain name to an IP address by either consulting an internal cache or sending a new query to the domain name server 120. If the domain name server 120 is not a recursive domain name server, then the policy enforcement engine 126 will send the query to a series of domain name servers to completely resolve the domain name to an IP address. Steps 208-212 are performed as described above. In step 214, after the policy enforcement engine has resolved the domain name to an IP address, the policy enforcement engine sends the resolved IP address to the mobile device 114. Step 216-218 are performed as described above. This alternative embodiment has the advantage of decreasing the time to resolve a domain name, particularly if the first domain name server that the mobile device 114 contacts is non-recursive and requires additional queries from the mobile device 114.

Some or all of the components described herein may in some embodiments be implemented as a computer processor coupled to a memory, the memory containing instructions that when executed by the computer processor, perform the functions as described above. Some or all of the components may be implemented as hard-wired circuits.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

We claim:

1. A method for an access network to make a policy decision based on a domain name query comprising:
   detecting the domain name query for a domain name sent by a mobile device to a domain name server through an access gateway, the detecting of the domain name query being performed by a policy enforcement engine in the access gateway;
   sending a copy of the domain name copy to a policy server;
   making an incomplete policy decision based on the domain name;
   sending the incomplete policy decision from the policy server to the policy enforcement engine;
   detecting, by the policy enforcement engine, a domain name response sent from the domain name server to the mobile device through the access gateway, the domain name response including an address for a service provider associated with the domain name that is queried;
   completing the policy decision by using the address for the service provider to add service provider address information to the incomplete policy decision; and
   applying the policy decision to a service data flow between the mobile device and the service provider.

2. The method of claim 1, wherein the making the incomplete policy decision further comprises making a policy decision with one or more service data flow filters that lack service provider address information, where the service provider address information comprises the address for the service provider.

3. The method of claim 1, wherein the detecting the domain name query further comprises examining packets passing through the access gateway, and detecting packets that have header destination addresses that match a regular expression, where the regular expression is based on a destination address for the domain name server.

4. An access network for making a policy decision based on a domain name query comprising:
   an access gateway configured to provide an access bearer to connect a mobile device to a service provider;
   a policy enforcement engine, being part of the access gateway, configured to detect the domain name query for a domain name sent by the mobile device to a domain name server, the policy enforcement engine configured to copy the domain name that is queried;
   a policy server logically linked with the policy enforcement engine, configured to make an incomplete policy decision based on the domain name that is queried;
   the policy enforcement engine further configured to detect a response sent from the domain name server to the mobile device through the access gateway, the response including an address for a service provider associated with the domain name that is queried;
   the policy enforcement engine further configured to copy the address for the service provider in the response;
   the policy enforcement engine further configured to complete the policy decision by using the address for the service provider to add service provider address information to the incomplete policy decision; and
   the policy enforcement engine further configured to apply the policy decision to a service data flow between the mobile device and the service provider.

5. The access network of claim 4, wherein the policy server configured to make the incomplete policy decision further comprises making a policy decision with one or more service data flow filters that lack service provider address information, where service provider address information comprises the address for the service provider.

6. The method of claim 4, wherein the policy enforcement engine configured to detect the domain name query further comprises the policy enforcement engine configured to detect the domain name query by examining packets passing through the access gateway, and detecting packets that have header destination addresses that match a regular expression, where the regular expression is based on a destination address for the domain name server.

7. An access network for making a policy decision based on a query comprising:
- a policy enforcement engine configured to detect the query about a domain name, the query sent from a mobile device to a domain name server through an access gateway;
- a policy server logically linked with the policy enforcement engine, configured to make an incomplete policy decision based on the domain name that is queried;
- the policy enforcement engine further configured to detect a domain name response sent from the domain name server to the mobile device, the domain name response including an address for a service provider associated with the domain name that is queried;
- the policy enforcement engine further configured to complete the policy decision by using the address for the service provider to add service provider address information to the incomplete policy decision; and
- the policy enforcement engine further configured to apply the policy decision to a service data flow between the mobile device and the service provider.

8. The access network of claim 7, wherein the policy server configured to make the incomplete policy decision further comprises the policy service configured to make a policy decision with one or more service data flow filters that lack service provider address information, where the service provider address information comprises the address for the service provider.

9. The access network of claim 7, wherein the policy enforcement engine configured to detect the query further comprises the policy enforcement engine configured to detect the query by examining packets passing through the access gateway, and detecting packets that have header destination addresses that match a regular expression, where the regular expression is based on a destination address for the domain name server.

10. The method of claim 1, wherein the making the incomplete policy decision further comprises making a policy decision with one or more service data flow filters that lack service provider address information, where the service provider address information comprises a regular expression based on the address for the service provider.

11. The access network of claim 4, wherein the policy server configured to make the incomplete policy decision further comprises configuring the policy server to make a policy decision with one or more service data flow filters that lack service provider address information, where the service provider address information comprises a regular expression based on the address for the service provider.

12. The access network of claim 7, wherein the policy server configured to make the incomplete policy decision further comprises the policy server configured to make a policy decision with one or more service data flow filters that lack service provider address information, where the service provider address information comprises the address for the service provider.

* * * * *